April 3, 1945.    R. G. ALLEN    2,372,642
GLASS BLOWING MACHINE
Filed Jan. 7, 1942    10 Sheets-Sheet 1

R. G. Allen
INVENTOR

BY Rule and Hoge
ATTORNEYS

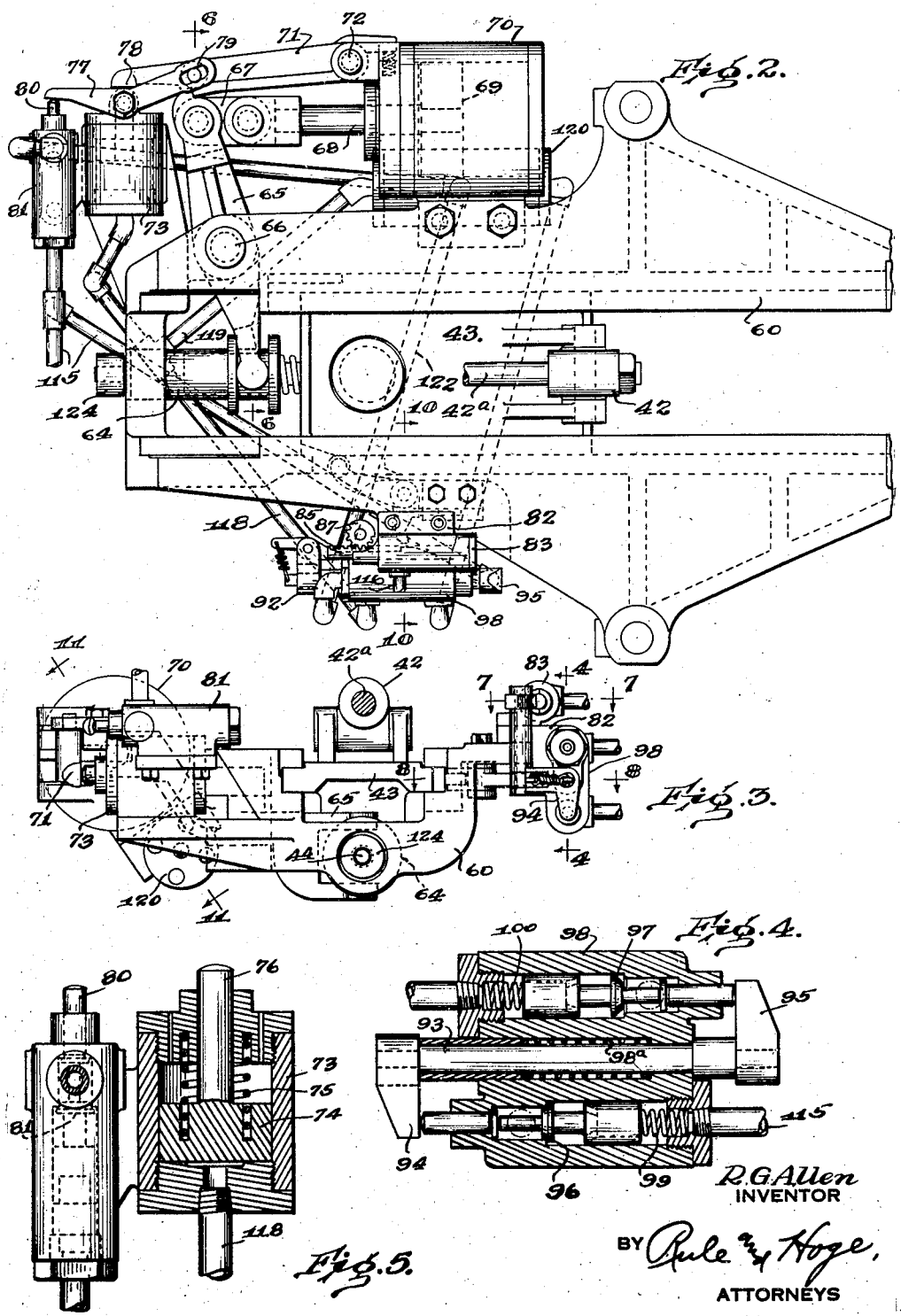

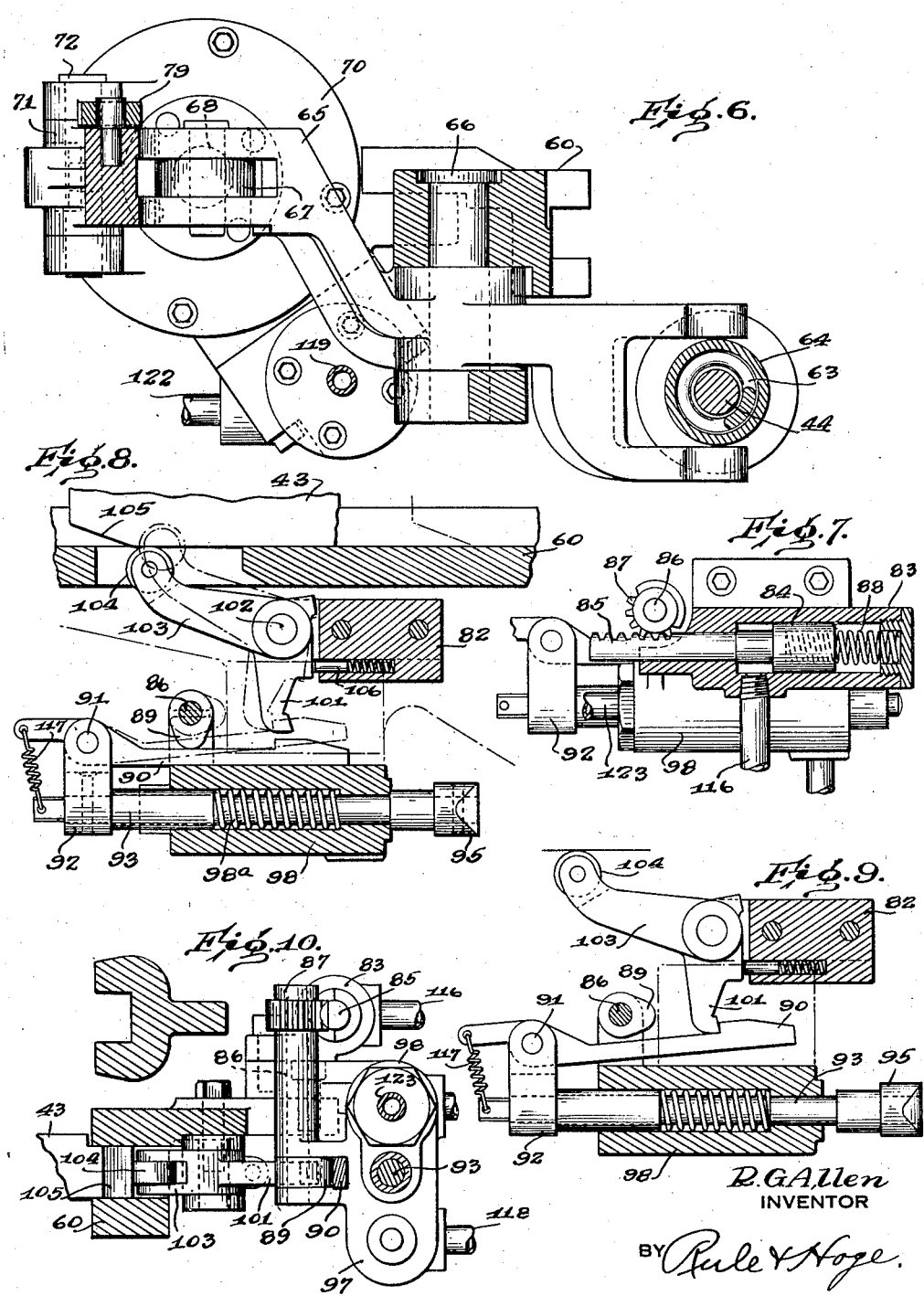

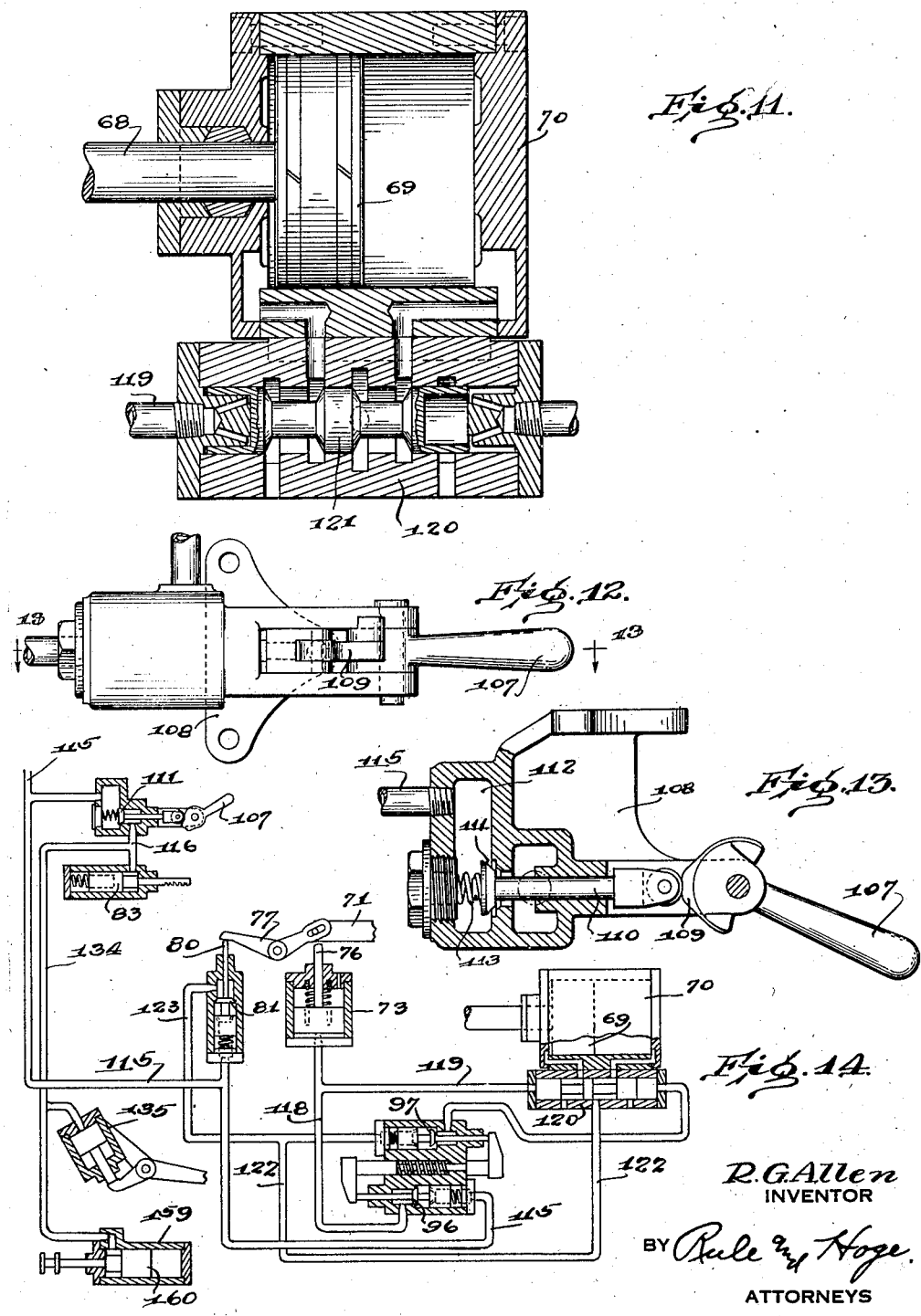

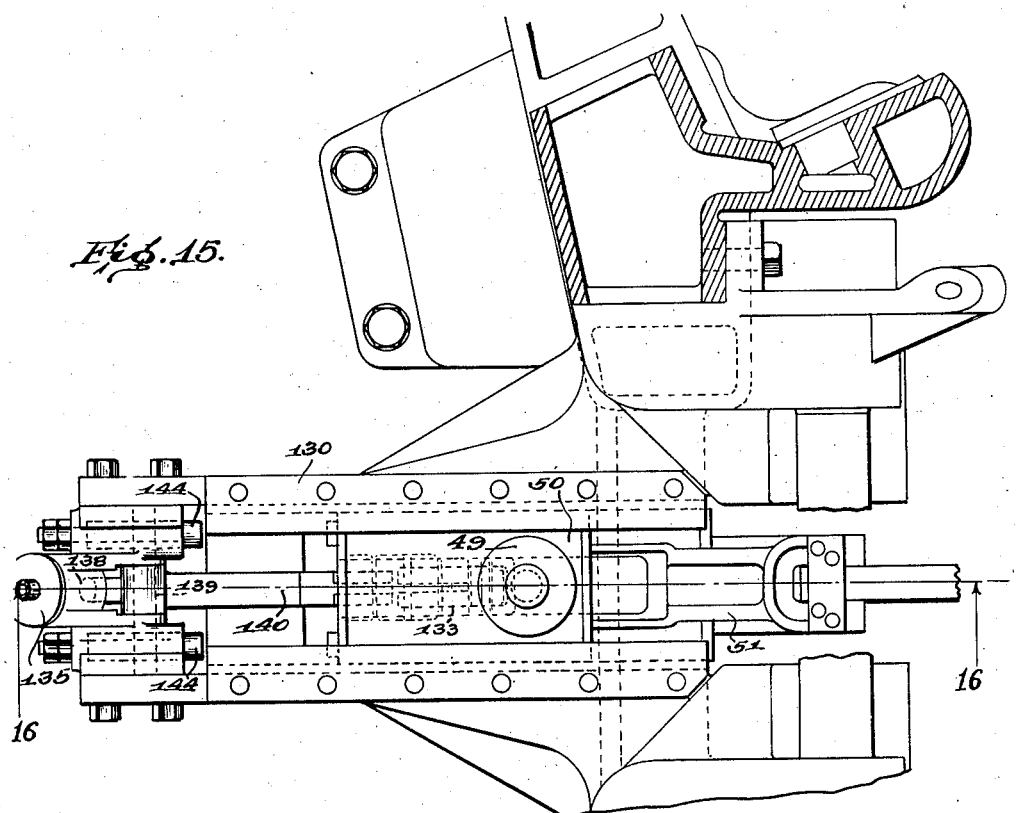
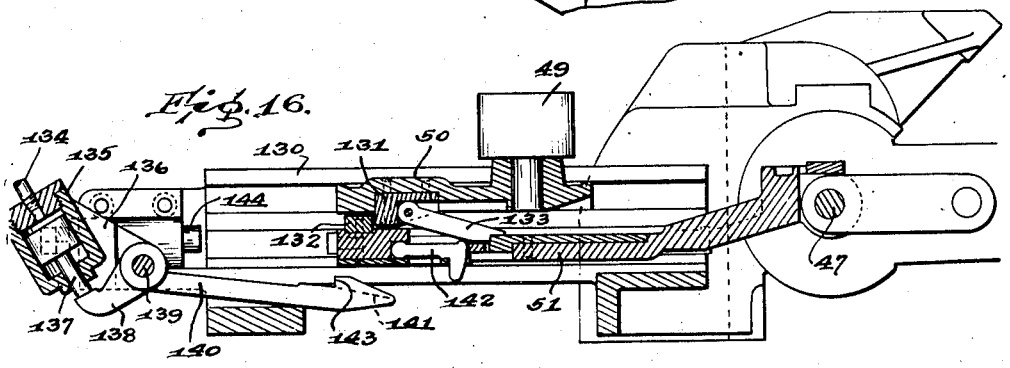
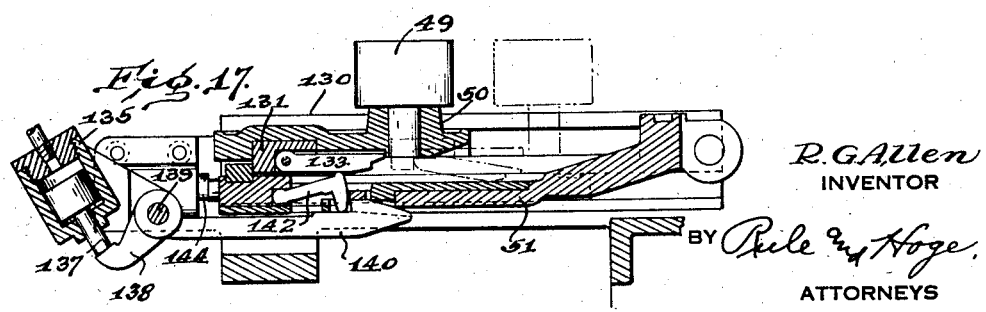

April 3, 1945.   R. G. ALLEN   2,372,642
GLASS BLOWING MACHINE
Filed Jan. 7, 1942   10 Sheets-Sheet 6

R.G.Allen
INVENTOR
BY
ATTORNEYS

April 3, 1945.  R. G. ALLEN  2,372,642
GLASS BLOWING MACHINE
Filed Jan. 7, 1942  10 Sheets-Sheet 7
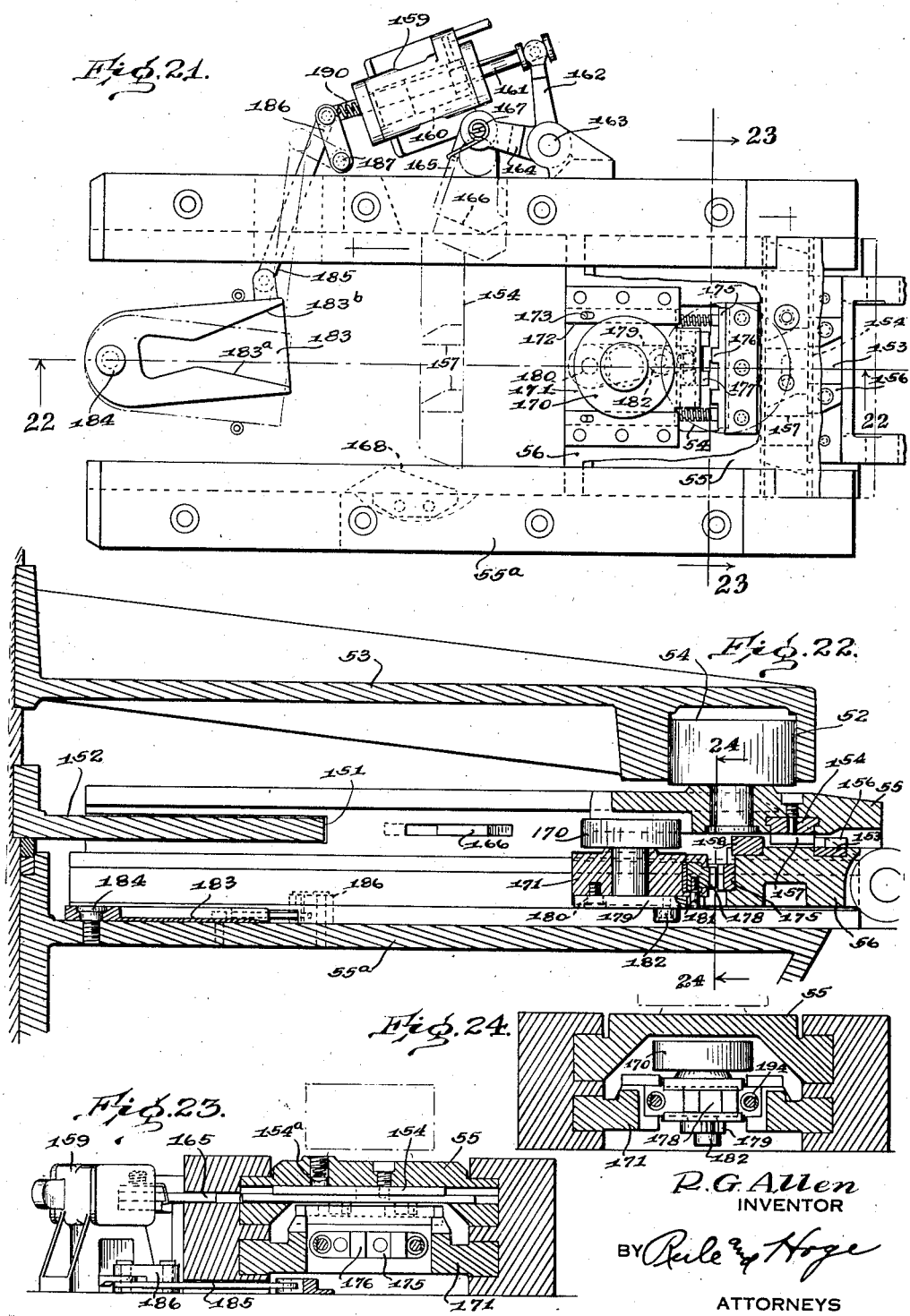

April 3, 1945. R. G. ALLEN 2,372,642
GLASS BLOWING MACHINE
Filed Jan. 7, 1942 10 Sheets-Sheet 8

R. G. Allen
INVENTOR

BY Rule & Hoge
ATTORNEYS

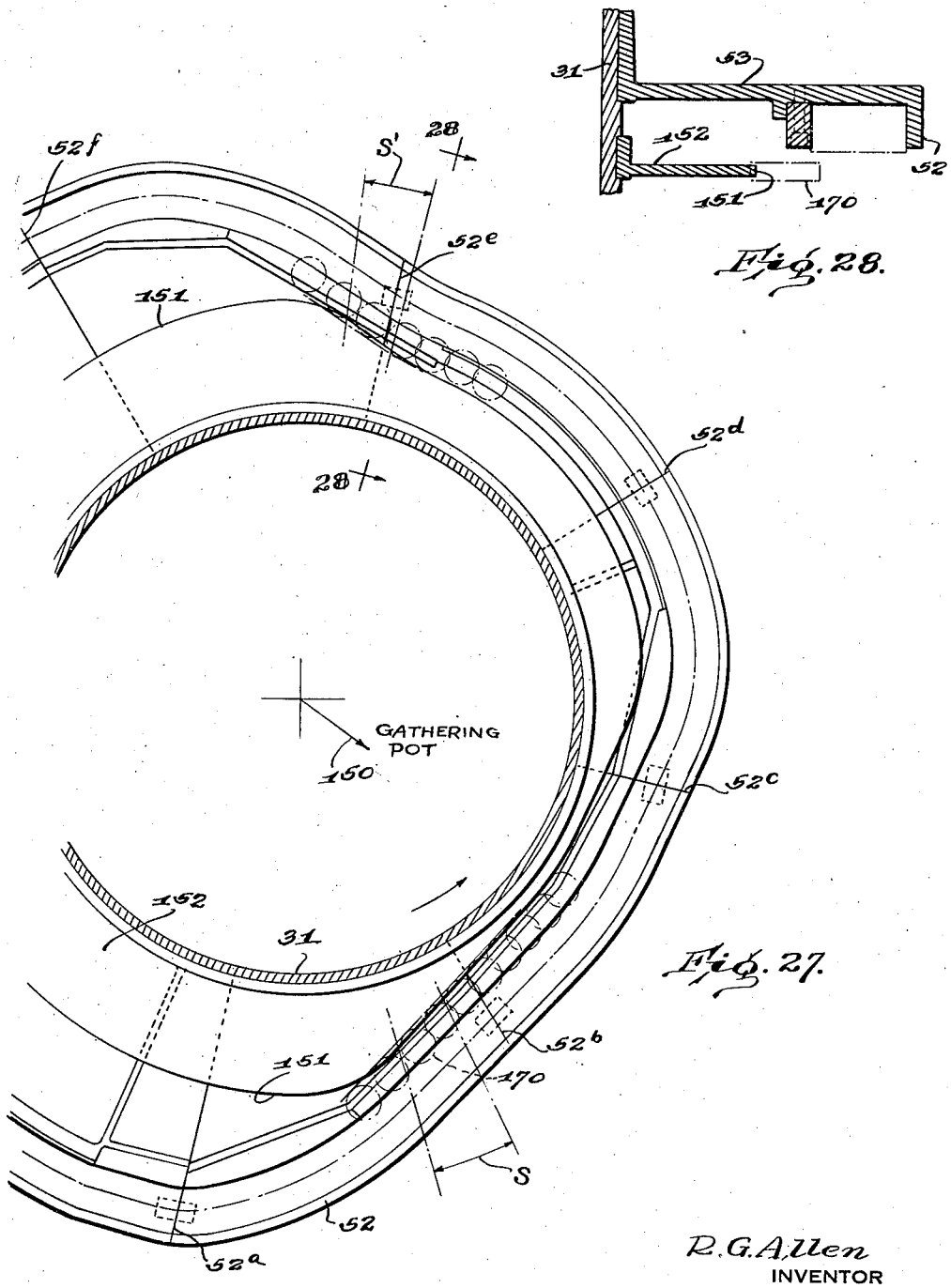

Patented Apr. 3, 1945

2,372,642

UNITED STATES PATENT OFFICE 2,372,642

GLASS BLOWING MACHINE

Russell G. Allen, Alton, Ill., assignor to Owens-Illinois Glass Company, a corporation of Ohio Application January 7, 1942, Serial No. 425,838

29 Claims. (Cl. 49—5)

My invention relates to machines for blowing glassware, such as bottles, jars and other hollow articles, and comprises means to facilitate changing of the molds while the machine is in operation. The invention as herein illustrated is embodied in an automatic glass blowing machine of the Owens suction gathering type, comprising a mold carriage which rotates continuously about a vertical axis and a series of heads or units rotating with the carriage. Each unit includes a mold group comprising a partible neck mold, a partible blank mold adapted to register with the neck mold, and a partible finishing mold. The blank mold is positioned beneath the neck mold and when closed registers with the closed neck mold to form a parison mold which is periodically lowered into contact with a pool of molten glass from which charges of glass are drawn into the mold. After the parison has been formed, the blank mold is opened, leaving the parison suspended from the neck mold. The finishing mold is then swung upward and closed around the parison and the latter blown to finished form therein. Thereafter the neck mold is opened and the finishing mold with the blown article therein is swung downward in order to clear the pot from which the glass has been drawn. After passing the pot the finishing mold is swung upward to an intermediate position and opened to discharge the blown article.

In machines of this type it is frequently necessary to change certain molds or an entire set of molds and it is highly desirable to provide means permitting the molds to be changed while the machine is running. Where it becomes necessary to stop the machine for changing molds, production is interfered with owing to the time which is lost while the machine is not running and the further time required for reestablishing temperature and operating conditions when the machine is again started.

In machines of the type indicated the time interval during each rotation of the mold carriage permitted for mold changing operations is very short and often insufficient to allow the removal or replacing of molds. This is particularly true in regard to the neck molds which are only opened for a short time as required to release the blanks. The finishing molds also remain closed the greater part of the time and when open are inaccessible for mold changing. An object of the present invention is to provide manually controlled means for holding the molds open and in accessible position a sufficient length of time to permit changing them without stopping the machine or slowing down the mold carriage.

A further object of the invention is to provide control devices individual to the mold groups whereby any selected mold group may be thrown out of operation in a manner to permit mold changing without interfering with the continued normal operation of the other mold groups.

In a machine of the type indicated it is necessary for each finishing mold to be swung downward as it passes the gathering pot to prevent interference. An object of the present invention is to provide controlling means individual to the mold groups whereby a selected finishing mold may, during a predetermined portion of each rotation of the mold carriage, be held in an intermediate position suitable for a mold changing operation, and also caused to swing downward for clearing the gathering pot during each such rotation of the carriage.

A further object of the invention is to provide manual control devices individual to the mold groups, each control device being operable to control the three mechanisms which are brought into activity for mold changing operations, namely, the mechanism controlling the opening and closing movements of the blank and neck molds, the mechanism controlling the opening and closing movements of the finishing mold, and the mechanism for controlling the up and down swinging movements of the finishing mold carrier.

Other objects of the invention will appear hereinafter.

The present application discloses subject matter, including the mechanism for controlling the opening and closing movements of the blank and neck molds disclosed and claimed in my copending application, Serial Number 425,840, filed January 7, 1942. The mechanism shown in the present application for controlling the opening and closing movements of the finishing mold is disclosed and claimed in my copending application, Serial Number 425,839 filed January 7, 1942, now Patent No. 2,351,899, granted June 20, 1944, Mold operating mechanisms.

Referring to the accompanying drawings which illustrate the invention as applied to a machine of the Owens type for blowing bottles and other hollow ware:

Fig. 1 is a sectional elevation of the machine, parts being broken away, showing one head or unit.

Figs. 2 to 11 inclusive illustrate the mechanism for controlling the opening and closing movements of the blank and neck molds when a unit is set for a mold changing operation.

Fig. 2 is a plan view showing a cam operated slide for opening and closing the blank mold and neck mold, and control devices for controlling the opening and closing of the molds in a manner to permit changing of the molds while the machine is running.

Fig. 3 is an end elevation view of the mechanism shown in Fig. 2.

Fig. 4 is an enlarged section at the line 4—4 on Fig. 3, showing valves and their operating means.

Fig. 5 is a part sectional plan view of a piston motor and a valve controlled thereby.

Fig. 6 is an enlarged section at the line 6—6 on Fig. 2.

Fig. 7 is a section at the plane of the line 7—7 on Fig. 3.

Fig. 8 is an enlarged section at the line 8—8 on Fig. 3.

Fig. 9 is a view similar to Fig. 8 but showing the parts in a different relative position.

Fig. 10 is an enlarged section at the line 10—10 on Fig. 2.

Fig. 11 is an enlarged section at the line 11—11 on Fig. 3.

Fig. 12 is a plan view of a manual control lever, herein referred to as an air valve lever, to operate the valve shown in Fig. 13 and thereby set the apparatus for a mold changing operation.

Fig. 13 is a section at the line 13—13 on Fig. 12.

Fig. 14 is a diagrammatic view of the pneumatic control system, the air motors and control valves being shown in section.

Figs. 15 to 20 inclusive illustrate a mechanism for controlling the finishing mold opening and closing mechanism when set for mold changing operations.

Fig. 15 is a part-sectional plan view showing the cam operated slides for opening and closing the finishing mold.

Fig. 16 is a longitudinal, part sectional elevation at the line 16—16 on Fig. 15.

Fig. 17 is a view similar to Fig. 16 but showing parts set for mold changing.

Figure 18:
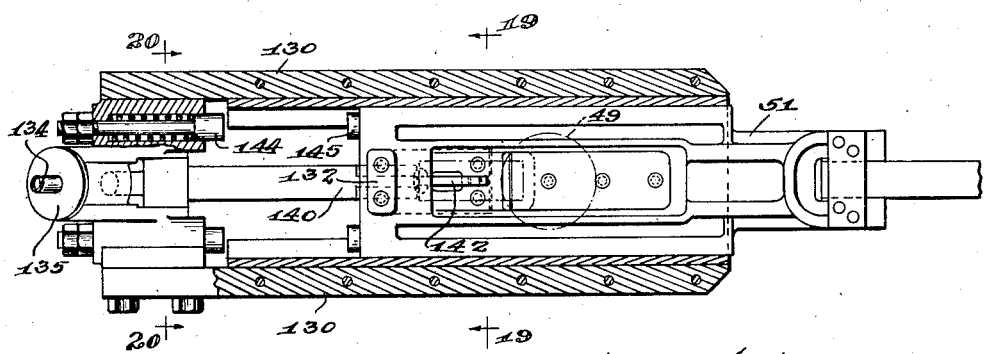
Figure 20:
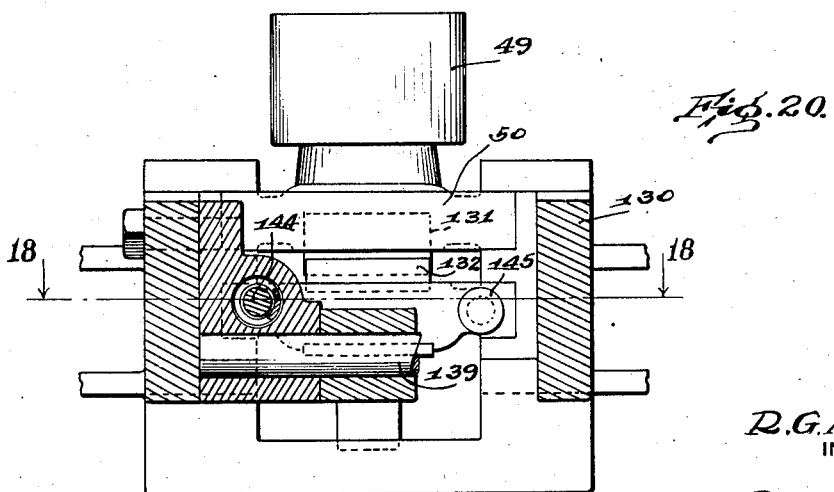

Fig. 18 is a view of mechanism shown in Fig. 15, partly in plan and partly in section at the line 18—18 on Fig. 20.

Figure 19:
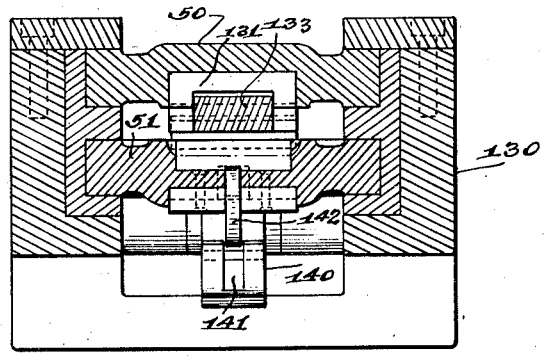

Figs. 19 and 20 are cross-sections at the lines 19—19 and 20—20 respectively on Fig. 18.

Figs. 21 to 26 inclusive illustrate mechanism for lifting and lowering the finishing mold and for controlling the lifting and lowering movements when the mold unit is set for a mold changing operation.

Fig. 21 is a plan view, with parts broken away, showing the mold swinging mechanism.

Fig. 22 is a sectional elevation at the line 22—22 on Fig. 21.

Fig. 23 is a section at the line 23—23 on Fig. 21.

Fig. 24 is a section at the line 24—24 on Fig. 22.

Figure 25:
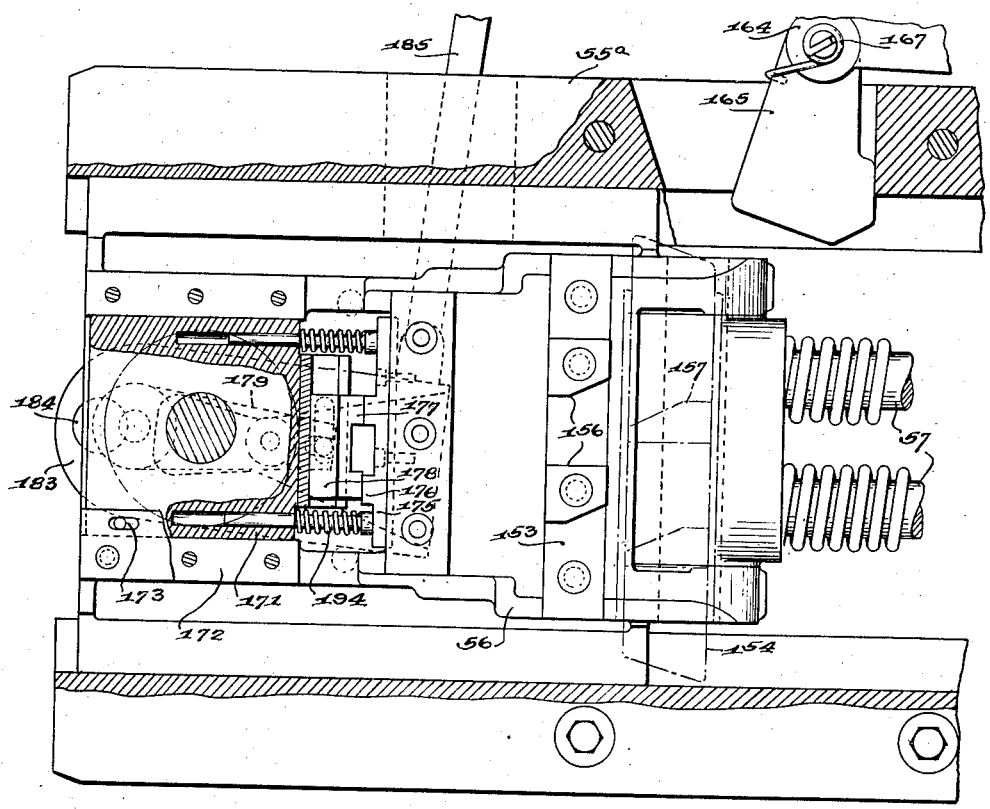

Fig. 25 is a part-sectional plan view on a comparatively large scale of mechanism shown in Fig. 21 but with the slides moved inwardly.

Figure 26:
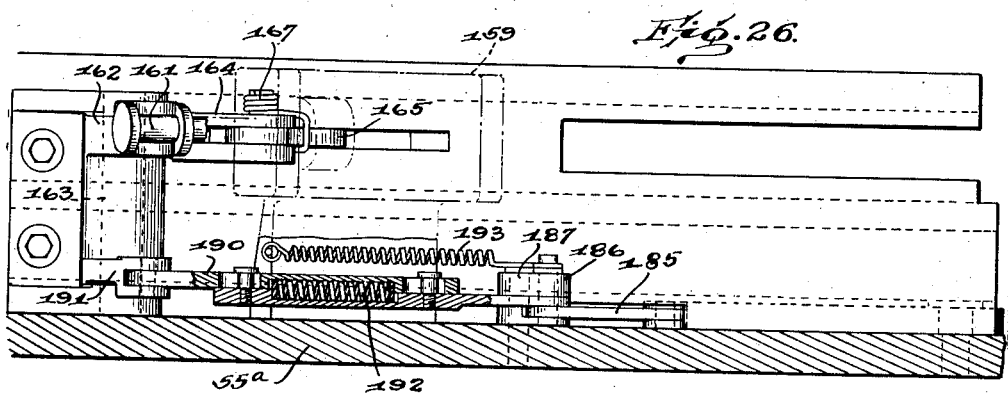

Fig. 26 is a part-sectional elevation showing cam shifting mechanism shown in Figs. 21 and 23.

Fig. 27 is a bottom part sectional view showing particularly the cams for controlling the up and down swinging movements of the finishing molds, the center column of the machine being shown in section.

Fig. 28 is a section at the line 28—28 on Fig. 27.

Figure 29:
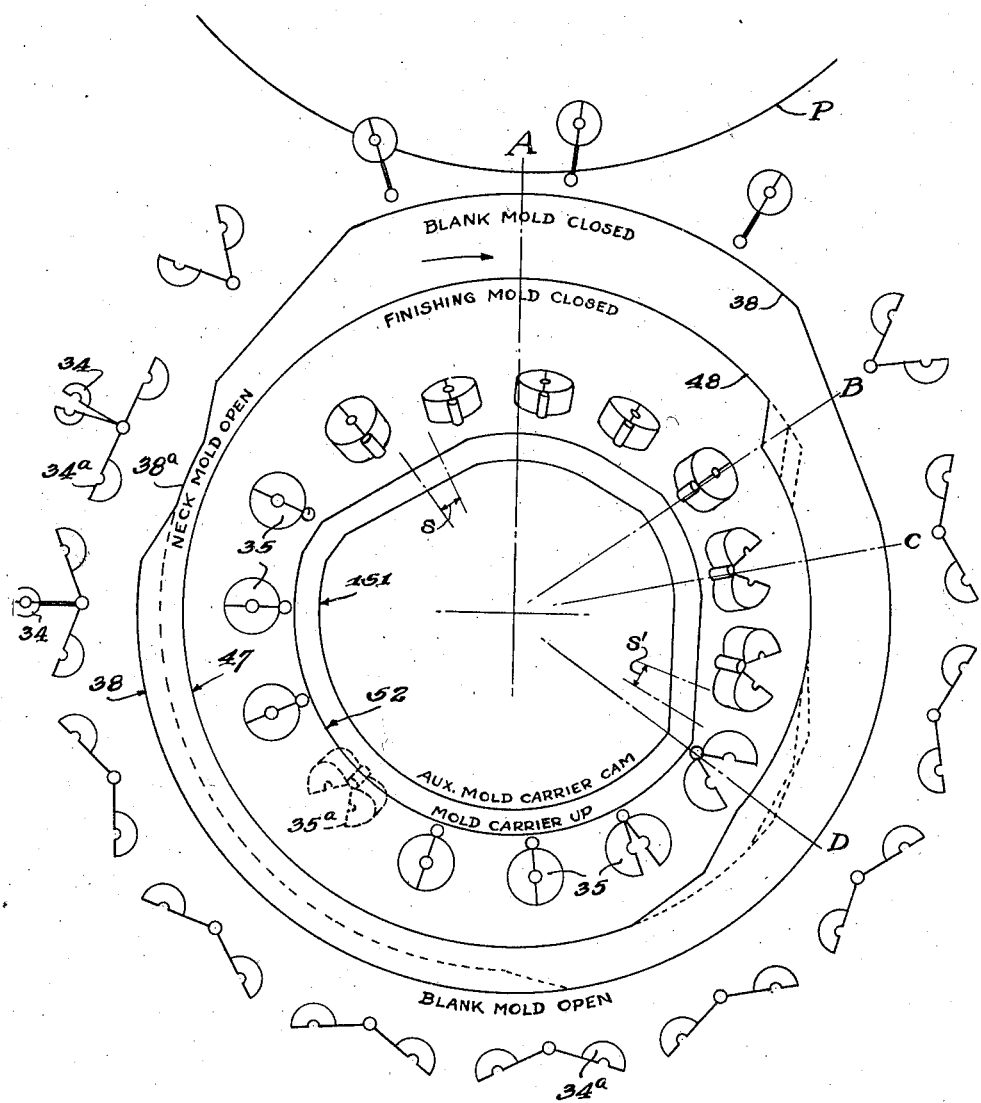

Fig. 29 is a cam chart.

Figure 1:
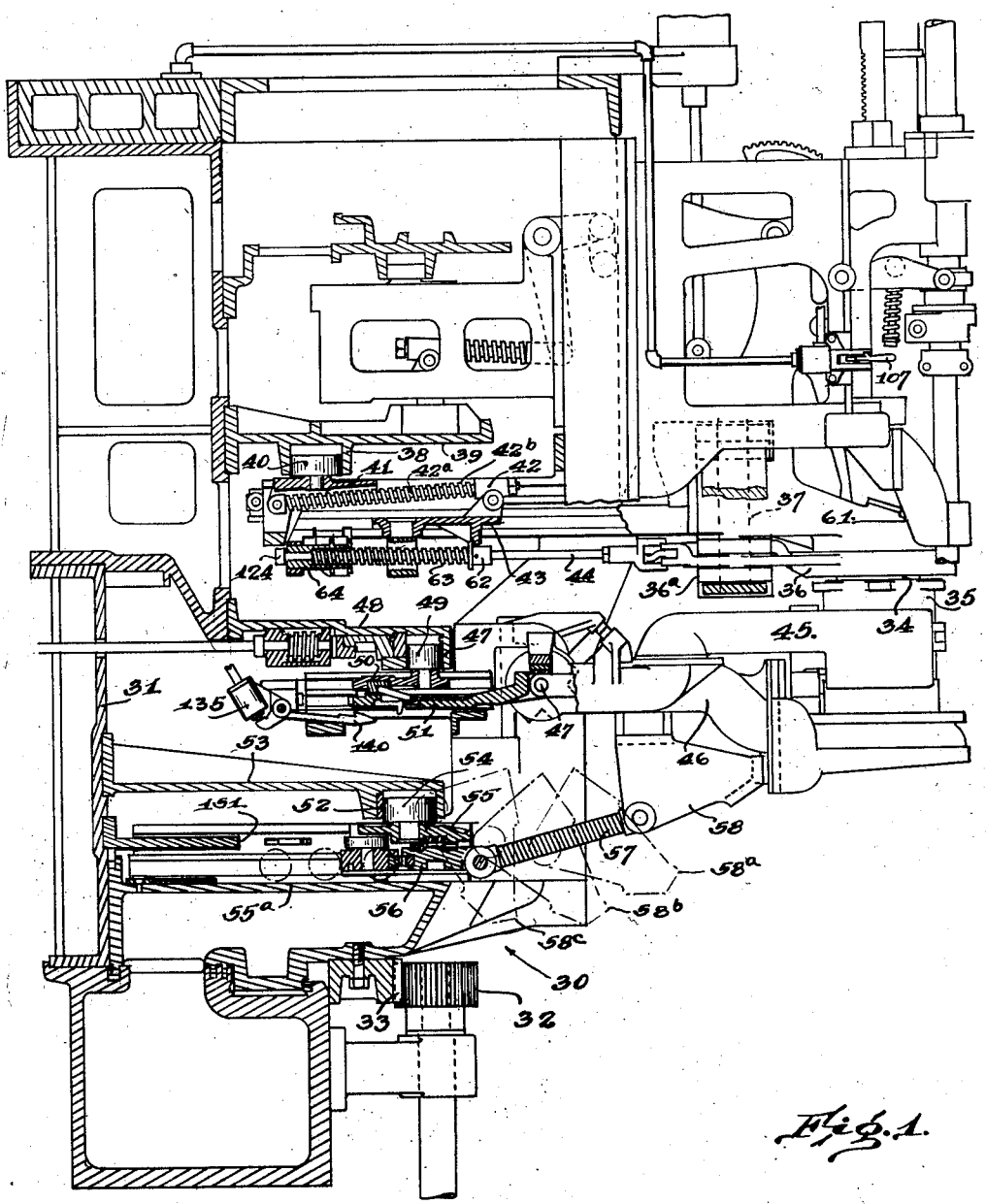

Referring particularly to Fig. 1, the machine comprises a mold carriage 30 mounted for continuous rotation about the vertical axis of a stationary center column 31. The carriage may be rotated by a motor driven pinion 32 which runs in mesh with a ring gear 33 on the carriage. A plurality of heads or units which may be arranged in an annular series on the mold carriage, each comprises a mold group including a blank mold 34ª (Fig. 29), a neck mold 34, and a finishing mold 35. The molds and their operating mechanisms may be in the main of conventional construction and operation, except as such mechanisms are modified to cooperate with means comprised in the present invention for controlling the mold movements to facilitate mold changing operations. For a full disclosure of an Owens type of machine, reference may be had to the patent to La France, 1,185,687, June 6, 1916. Reference may also be had to the Allen patent, Number 2,269,391, January 6, 1942, Machine for molding glass articles, which discloses a machine of substantially the same construction as that to which the present invention is applied as herein illustrated.

The neck mold sections 34 (Fig. 1) are carried on arms 36 mounted to swing about a pivot pin 37 for opening and closing the neck mold. The blank mold sections are in like manner carried on arms 36ª mounted to swing on the pin 37. These movements of the blank mold and neck mold are controlled by a stationary cam track 38 formed on a cam plate 39. A cam roll 40, running on the cam track 38, is carried by an upper slide 41 having a yielding connection with a lower slide 43. Said connection includes a rod 42ª slidable in a connector 42, and compression spring 42ᵇ coiled on the rod. The slide 43 has operating connection through a rod 44 with the blank mold carrying arms which operate in a conventional manner to swing the neck mold arms and open the neck mold during the final opening movement of the blank mold. The opening and closing of the neck mold is effected by a neck mold cam 38ª (Fig. 29), which forms a part of the blank mold cam 38.

The finishing mold sections 35 are carried on arms 45 pivotally mounted for swinging movement on a frame 46, herein referred to as the finishing mold carrier. Said frame is mounted as usual to swing up and down about a horizontal axis 47ª for lifting the finishing mold into register with the neck mold 34 and for lowering the finishing mold.

The opening and closing movements of the finishing mold are under the control of a stationary cam track 47 formed on a cam plate 48. A cam roll 49 running on the cam track is carried on an upper slide 50 operatively connected, as fully described hereinafter, to a lower slide 51, which has operating connections with the mold swinging arms 45.

The up and down swinging movements of the finishing mold carrier 46 are controlled by a cam track 52 on a stationary cam plate 53. A cam roll 54 running on the cam 52 is carried by an upper slide 55 operatively connected to a lower slide 56. The latter has a link connection 57 with a bracket 58 fixed to and forming a part of the mold carrier 46. The slides 55 and 56 are mounted to reciprocate in a slide frame 55ª.

The order of sequence in which the mold movements take place during the normal operation of the machine for forming the articles and also when the control devices are set for mold changing operations, will be understood by reference to the cam chart, Fig. 29. When a mold group is in the position indicated by line A, the parison mold is over the gathering pot P and in dip for gathering a charge of glass, the blank mold being closed and in register with the closed neck mold.

The finishing mold at this time also has been closed and swung downward to its lowermost position for clearing the gathering pot. As the mold group advances to position B, the finishing mold carrier swings upward to an intermediate angle and when the position C is reached, the finishing mold has been opened to discharge the finished article. By this time the blank mold also has been opened under the control of the cam 38 and then remains open during the greater portion of its complete rotation with the carriage. After the finishing mold has been opened it continues its upward swinging movement and when the point D is reached, is in its lifted position and as it advances from this point is closed around the parison which at this time is suspended from the neck mold. The parison is then blown to finished form. The finishing mold remains closed until it has again passed the gathering pot. The neck mold 34 is opened when the neck mold cam section 38ª is reached, thereby releasing the blown parison to the finishing mold which then moves downward to clear the gathering pot.

When the control means is set for a mold changing operation, as hereinafter described, the finishing mold carrier during its upward swing, after the mold has discharged the blown article, is released from the control of the cam track 52 at a transfer zone S' and brought under the control of an auxiliary cam track 151, which maintains the finishing mold at an intermediate angle (herein shown as 35° below the horizontal) convenient for changing the finishing molds. The angular position of the mold is indicated in dotted lines at 35ª. The mold carrier is retained at this angle until it reaches the transfer zone S (Fig. 29) near the gathering pot when it is again placed under the control of the main cam 52 (as hereinafter described) so that the mold carrier is swung down to clear the pot, and then as it swings upward and reaches said intermediate angle, is again placed under the control of the auxiliary cam track 151. When the apparatus is set for mold changing operation, the opening and closing movements of the finishing mold are also taken out of the control of the cam 47, so that the finishing mold is held open while in its inclined position under the control of the cam 151. When the apparatus is set for a mold changing operation, the blank and neck molds also are taken out of the control of their cam 38, 38ª. The opening of the neck mold then takes place when the blank mold is opened, as hereinafter described, independently of the neck mold opening cam 38ª.

Three separate mechanisms are provided on each mold unit for controlling the movements of the molds when set for mold changing operation. The first mechanism controls the opening and closing movements of the neck mold. The second mechanism controls the opening and closing movements of the finishing mold, and the third mechanism controls the swinging movements of the finishing mold carrier by which the finishing mold is lifted and lowered. These mechanisms are embodied in a fluid (preferably air) control system which is manually set for operation by a hand lever, herein referred to as the air valve lever, which controls the supply of an operating fluid, as air, to said system.

The mechanism for controlling the movements of the blank and neck molds will now be described, having reference to Figs. 1 to 14 inclusive.

The lower slide 43 is mounted in a slide plate 60 (Fig. 2) for reciprocating movement toward and from the center of the machine for opening and closing the blank and neck molds. The plate 60 is secured to the dip frame 61 (Fig. 1) by which the mold is lowered and lifted to and from the glass in the gathering pot or tank. The operating connection between the slide 41 and the rod 44 (Fig. 1) includes a flanged collar 62 which is pinned to the rod 44 and engages a boss on the slide 43. During normal operation, as the cam 38 draws the slide 41 inwardly toward the center of the machine, it operates through the rod 42ª, and slide 43 to draw the rod 44 inwardly and open the neck molds which are being held closed by a spring 63 held under compression between said collar and a sleeve 64 (Figs. 1 and 2) slidably mounted on the rod, said sleeve also being slidable lengthwise in the end of the plate 60.

During the normal operation of the machine the sleeve 64 is held in the position shown in Figs. 1 and 2 by a lever 65 pivoted at 66 on the plate 60. The lever 65 is operatively connected through a link 67 with the piston rod 68 and piston 69 of an air motor 70. The lever 65 is normally held in the position shown (Fig. 2) by a latch 71 pivoted at 72 to the motor cylinder. The latch is released by the operation of an air motor 73 (Figs. 2, 5 and 14) operating in the manner hereinafter described. The motor 73 includes a piston 74 normally held in its inward position by a spring 75, said piston carrying a plunger 76, the outer end of which engages the latch arm 71 so that when the piston is moved outward, the latch is released from the lever 65. A lever 77, fulcrumed at 78 on the casing of the motor 73, has a slot and pin connection 79 with the latch arm 71. The outer end of the lever 77 engages a valve plunger 80 of a valve 81 (Figs. 5 and 14) mounted in a valve casing attached to the motor 73. When the plunger 76 is projected and releases the latch arm 71, the latter operates through the lever 77 to open the valve 81.

Referring to Figs. 2, 3, 8 and 9, a bracket 82, bolted to the plate 60, has mounted thereon an air motor 83 including a piston 84 (Fig. 7) connected to a rack bar 85. A rock shaft 86 journalled in the bracket 82, carries a segmental pinion 87 running in mesh with the rack 85. The rack bar is held in the position shown by a coil spring 88 behind the piston 84. The rock shaft 86 carries at its lower end a cam 89 (Figs. 8 and 10) which cooperates with a latch lever 90 pivoted at 91 in an arm 92 which is secured to a valve operating rod 93. As shown on Fig. 4, the rod 93 carries heads 94 and 95 attached to its opposite ends respectively, the head 94 being formed integral with the arm 92. Said heads are in engagement with valve operating plungers for opening valves 96 and 97 respectively. Said valves and the rod 93 are mounted in a valve casing 98 attached to or formed integral with the bracket 82. The rod 93 is normally held in the Fig. 4 position by a coil spring 98ª, in which position it holds the valve 97 open while the valve 96 is held closed by a spring 99. When the rod 93 is moved to the right as hereinafter described, it opens the valve 96 and permits the valve 97 to be closed by its spring 100.

The latch 90 (Figs. 8 and 9) cooperates with a dog 101 which rocks on a pivot pin 102 in the bracket 82. The dog is formed integrally with a rock arm 103 carrying a roll 104 which projects into the path of the slide 43. The slide is formed with a cam surface 105 which, when the slide 43 is moved inwardly, namely, toward the center of the machine, for opening the molds, swings the rock arm 103 and dog 101 into the full line position (Fig. 8), said dog and arm being returned to the broken line position by a spring actuated pin 106 when the slide is moved outwardly.

The operation of the cam 89 (Fig. 8) is manually controlled by the air valve lever 107 (Figs. 12, 13 and 14) mounted on a bracket 108 and formed with a cam 109 which, when the hand lever is lowered, moves a valve rod 110 inwardly and opens a valve 111 in a valve chamber 112. When the hand lever is lifted the valve is closed by a spring 113. Air pressure lines 115 (Figs. 1, 13, 14), individual to the mold groups or units, extend from an annular air pressure chamber 115ª on the carriage to each valve chamber 112 so that when the valve 111 is opened, air pressure is supplied through a pipe 116 to the piston motor 83 which operates through the rack and pinion mechanism to swing the cam 89 and release the latch 90 (Fig. 9).

The operation of the above described control mechanism for the neck and blank molds is as follows: When the air valve lever 107 is thrown down to cause the cam 89 to withdraw and release the latch 90, as above described, the latch is swung outwardly by its spring 117 for cooperation with the dog 101. If at this time the slide 43 is in its outward position, or if not, then when the slide is moved outwardly so as to permit the dog 101 to move to the broken line position (Fig. 8), the latch 90 swings upward to engage the dog. When the slide 43 again moves inwardly and actuates the arm 103, the dog 101 is moved to the full line position and thereby moves the latch 90 bodily to the right a short distance, carrying with it the valve operating rod 93. This serves to reverse the valves 96 and 97 (Figs. 4 and 14). That is, the valve 96 is opened and the valve 97 is closed.

Referring to Fig. 14, it will be seen that the air pressure line 115 extends to the right-hand end of the valve chamber of the valve 96 so that air under pressure is supplied through the valve and a pipe 118 leading therefrom to the lower end of the piston motor 73. The motor therefore operates the plunger 76 and swings the latch lever 71 (Fig. 2) to release the lever 65 and at the same time actuates the lever 77 and thus opens the valve 81. Air under pressure is also transmitted through the pipe 118 (Fig. 14) and a branch pipe 119 (Figs. 2, 11 and 14) to the left-hand end of a valve chamber 120 in which is mounted a valve 121 controlling the air supply to the motor 70. The air pressure through the pipe 119 moves the valve to the right and thereby opens communication through a pipe 122 to the left-hand end of the motor cylinder. At the same time the valve 81 is opened (as above described) by the lever 77, so that air under pressure is supplied therethrough to a pipe 123 and the pipe 122 to the motor 70 and moves the motor piston 69 to the right. The lever 65 (Fig. 2) is thus actuated and moves the sleeve 64 to the left. The sleeve 64 operates through a head 124 on the rod 44 to move the latter to the left or inwardly and thus moves the neck molds to open position and holds them open as long as air pressure is maintained in the motor 70 for holding the piston 69 in its air operated position. While the air pressure is maintained in the motor, the slide 41 may continue its inward travel when the neck mold opening cam 38ª (Fig. 29) is reached, but this is and idle movement. Evidently when the cam 38 moves the slide outwardly for closing the blank mold after traveling in open position with the mold carriage through a half revolution of the carriage, the cam 105 on the slide 43 (Fig. 8) will release the lever 103, permitting it to swing inwardly. This allows the spring 93ª to return the rod 93 to its original position, thereby closing the valve 96 and opening the valve 97 (Figs. 4 and 14). When the valve 96 is closed it cuts off and exhausts the air from the valve piston 121 (Fig. 11) and also from the air motor 73 (Figs. 2 and 5), thereby allowing the spring 75 to retract the piston 74 and plunger 76, but as the lever 65 is holding the latch 71 in its outer position, the air valve 81 is held open by the lever 77. At the same time that the valve 96 is closed the valve 97 is opened and allows air under pressure to enter the right-hand end of the valve 120 (Figs 11 and 14), thereby forcing the piston 69 to the left, which operates to swing the lever 65 in a counter-clockwise direction. The lever thus forces the sleeve 64 (Figs. 1 and 2) and spring 63 to the right. The spring operates through the collar 62 to move the rod 44 to the right, thereby closing the neck molds 34. When the motor piston 69 reaches the end of its stroke, it allows the latch 71 to drop behind the lever 65 so that the neck molds are held closed for normal operation. When the latch 71 drops, it also actuates the lever 77, permitting the valve plunger 80 to move outwardly, thereby closing the valve 81 and cutting off the air supply through said valve. This cycle of operation is repeated during each revolution of the machine while the mold control valve 111 (Figs. 13 and 14) remains open.

The mechanism for controlling the opening and closing movements of the finishing mold 35 will now be described, reference being had to Figs. 14 to 20 inclusive. The upper and lower slides 50 and 51 are mounted to reciprocate in slideways in a frame 130. Blocks 131 and 132 (Fig. 16) secured respectively to the upper and lower slides provide a driving connection between the slides by which the inward movement of the upper slide is transmitted to the lower slide for opening the finishing mold. During the normal operation of the machine the outward movement of the upper slide is transmitted to the lower slide through a latch 133 which is pivoted at one end in the block 131, the free end of the latch being arranged to engage the slide 51.

When the manual control valve 111 (Fig. 14) is opened to set the mechanism for mold changing, air pressure is supplied through the pipe 116 and a pipe 134 to a piston motor 135 (Figs. 14 to 18) carried on a bracket 136 having a fixed mounting in the guide frame 130. A plunger 137 on the motor piston engages a rock arm 138 pivoted on a rod 139. A latch arm 140, which may be integral with the arm 138, is formed with a cam surface 141 adapted to engage a finger 142 pivoted in the slide 51.

When air is supplied to the motor 135 it operates to swing the arm 140 upward so that when the lower slide 51 moves inwardly or to the left from the Fig. 16 position, the finger 142 is cammed upwardly and lifts the latch 133. This releases the upper slide so that it may move outwardly independently of the lower slide. The outer end of the lever 140 is formed with hooks or shoulders 143 to engage the slide 51 at opposite sides of the finger 142, thus holding the slide in its inner position with the mold sections held apart. The mold is thus held open as long as the air pressure is maintained in the motor 135.

Spring buffers 144 are mounted in the frame 130 in position to be engaged by contact pieces 145 on the inner end of the slide 51 as the latter nears its innermost position. When the latch lever 140 has been moved upward to its operative position, and the upper slide 50 moves outwardly, the buffers 144 serve to apply a yielding pressure of the slide 51 against the hooks 143. This prevents the latch 140 from dropping and releasing the slide 51 when pressure is cut off from the motor 135, until the upper slide has been moved inwardly again to engage the lower slide and thus release the latch lever which then drops by gravity. Thus premature outward movement of the lower slide and closing of the finishing mold are prevented. The buffers 144 also insure contact between the blocks 131 and 132 and thereby allow ample clearance for the latch 133 to drop in place.

The mechanism for controlling the lifting and lowering movements of the finishing mold carrier, as shown in Figs. 1, 14, 21 to 28 inclusive, will now be described. The normal up and down swinging movements of the mold carrier as before noted are controlled by the stationary cam track 52. Referring to Fig. 27, the cam track 52 comprises a section extending from the radial line 52ᵃ to 52ᵇ, inclined toward the center of the machine for moving the cam roll inwardly, thereby lowering the mold carrier to clear the gathering pot, the position of which is indicated by the arrow 150. Commencing at about the line 52ᶜ, the cam roll is moved outwardly to lift the finishing mold to an intermediate inclination which is maintained while it passes through the discharging zone extending between the points 52ᵈ and 52ᵉ, during which the mold is opened and the blown article discharged. The cam track from point 52ᵉ to 52ᶠ is shaped to complete the lifting of the mold carrier to its horizontal position, which is maintained until the cam roll again reaches the point 52ᵃ.

During a mold changing operation the mold carrier is taken out of the control of the main cam track 52 during a certain portion of each rotation of the mold carriage and during such time is under the control of an auxiliary cam track 151 formed on a stationary cam plate 152 mounted on the center column 31. The auxiliary cam track as shown in Fig. 27 comprises a portion concentric with the mold carriage and so positioned that the mold carrier is held thereby at an angle between its horizontal or lifted position and its discharging position. This angular position or degree of elevation at which the mold carrier is held by the cam track 151 to permit changing of the mold is indicated at 58ᵃ (Fig. 1), being at an angle of about 35° to the horizontal. The discharging position 58ᵇ in the particular construction shown is at an angle of 55° to the horizontal. The lowermost position 58ᶜ is that assumed while the finishing mold is passing the gathering pot.

During normal operation of the machine a driving connection between the upper and lower slides 55 and 56 is maintained by means of a cross-bar 153 secured to the slide 56, and a connector in the form of a cross-slide bar 154 mounted for sliding movement in the upper slide 55. The bar 153 is formed with lugs 156 on its upper surface in the path of lugs 157 formed on the under side of the slide bar 154. The weight of the mold carrier 46 serves normally to hold the lugs 156 in contact with the lugs 157. A bar 158 (Fig. 22) is bolted to the lower slide 56 at the left or inner side of the lugs 157. Normally as the cam roll moves inwardly, the mold carrier swings downward by gravity, thus moving the lower slide 56 inwardly. If, for any reason, this gravity movement is interrupted or prevented, the lugs 157 engage the bar 158 and move the lower slide inwardly. The bar 158 thus serves as a safety means to insure the mold carrier being lowered as the cam roll 52 is moved inwardly.

The slide bar 154 is movable lengthwise to carry the lugs 157 out of register with the lugs 156 to permit idle movement of the upper slide 55 when the lower slide is under the control of the auxiliary cam track 151. Friction disks 154ᵃ (Fig. 23) bear on the slide bar 154 to prevent accidental movement of the slide bar.

The means for actuating the slide bar 154 includes an air motor 159 (Figs. 14 and 21) under the control of the manual control valve 111 (Fig. 13). The motor includes a piston 160 and a piston rod 161 connected to one arm 162 of a bell crank lever pivoted at 163 on a bracket carried by the slide frame. The other arm 164 of the bell crank has pivoted thereto an arm 165 which functions as a cam, being formed at its outer end with a cam surface 166 adapted to be moved into the path of the cross-bar 154. A coil spring 167 holds the cam arm 165 in its operative position (Fig. 21) relative to the arm 164, while permitting it to swing about its pivot when engaged by the slide bar 154 as the latter moves inwardly with the slide 55.

When the control valve 111 is opened by the hand lever 107, air under pressure is supplied to the motor 159 which then operates to move the cam 165 inwardly into the path of the cross-slide bar 154. If the slide 55 at this time is in its outward position or in such position that the cross-slide bar 154 is to the right of the cam 165 (Fig. 21), then when the slide 55 is moved inwardly, the slide bar 154 is carried past the cam arm 165, the latter swinging about its pivot. When the slide 55 is again moved outwardly for lifting the mold carrier, the cross-slide bar 154 engages the cam surface 166 so that the slide bar is cammed in the direction of its length and the lugs 157 are thereby moved out of line with the lugs 156. This releases the upper slide 55 so that the mold carrier is left in the control of the auxiliary cam track 151 which operates through means as hereinafter described to hold the mold carrier in position for changing molds. The mold carrier is now in the position indicated at 58ᵃ (Fig. 1), permitting the mold changing operations and is retained at this intermediate elevation by the cam track 151 while the slide 55 moves idly outward and then back. As the slide 55, during its return movement, passes the intermediate position corresponding to the position 58ᵃ of the mold carrier, the cross-transfer slide 154 carried thereby is cammed lengthwise by a cam 168 (Fig. 21) mounted on the slide frame 55a. This takes place just after the slide bar has passed inwardly beyond the cam 165. This movement of the slide bar 154 again brings the lugs 157 in register with the lugs 156. If the air pressure has been cut off from the motor 159 in the meantime or is cut off before the slide 55 again moves forward for lifting the mold carrier, then the cam 165 will be withdrawn so that as the slide 55 moves forward, the cross-bar 154 will retain its normal operative position. If, however, air pressure has been maintained in the motor 159, the cam 165 will again operate the slide 154 as before described to release the main slide 55, permitting it to move idly while the mold carrier is again held in its mold changing position 58a.

The cam track 151 operates through a cam roll 170 on an auxiliary lower slide 171 carried on the slide 56, to hold the mold carrier in its mold changing position. The primary purpose of mounting the cam roll 170 on an auxiliary slide, rather than the main lower slide 56, is to avoid picking up the load of the mold carrier on the cam 151 at each rotation of the mold carriage during normal operation and thereby avoid wear on the cam. The mode of operation by which this is accomplished will appear presently. The auxiliary slide 171 is mounted for a limited sliding movement on the main lower slide 56, being slidable in guideways 172 and its movement being limited by slot and pin connections 173 (Figs. 21 and 25). The slide 56 carries a crossbar 175 formed with lugs 176 adapted to register with lugs 177 formed on a slide bar 178. The bar 178 is mounted for lengthwise sliding movement in the auxiliary slide 171 for moving the lugs 177 into and out of line with the lugs 176.

Means for actuating the slide bar 178 includes a rock arm 179 pivoted at 180 on the lower side of the slide 171, said rock arm having a connection 181 with the slide bar. The arm 179 carries a cam follower roll 182 and is actuated by a cam 183. The cam is connected by a pivot 184 to the mold carriage and is swung about its pivot by the piston motor 159. The connections between the motor and cam include a link 185 pivoted at one end to the cam and at its opposite end to a rock arm 186 mounted to swing about a pivot 187. The rock arm is connected through a link 190 (Figs. 21, 26) to a rock arm 191 on the pivot shaft 163. The link 190 as shown in Fig. 26 is extensible in length, being made in sections which house a compression spring 192 which serves as a safety device. A coil spring 193 held under tension operates to return the motor piston 160 and cam 183 when the air pressure is cut off from the motor.

When the parts are set for the normal operation of the machine, with the lugs 176 and 177 in staggered relation as shown in Fig. 21, the cam 183 is inoperative to bring said lugs into alignment. In other words, when the cam slides 56 and 171 move inwardly, the cam roll 182 is carried between the cam surfaces 183a and 183b of the cam without shifting the slide bar 178. When the motor 159 has operated to swing the cam 183 to the broken line position (Fig. 21), then the inward movement of the slide 171 brings the cam roll 182 into engagement with the cam surface 183b and shifts the slide bar 178 to the Fig. 25 position in which the lugs 177 and 176 are in register. The auxiliary cam track 151 and the main cam track 52 are relatively shaped and positioned so that as the cam roll 170 approaches the slide transfer position S (see Fig. 27) at which the cross-slide bar 154 is shifted, the cam roll 170 moves the slides 171 and 56 outwardly relative to the upper slide 55, a sufficient distance to separate the lugs 156 and 157 and thus relieve the pressure between said lugs. In other words, the pressure due to the weight of the mold carrier is taken off the upper slide 55 and the cam track 52 and transferred to the lower slide and auxiliary cam track.

During the normal operation of the machine, when not set for mold changing, the lugs 176 and 177 remain in staggered relation as shown in Fig. 21 and the upper slide 55 carries the load, the auxiliary slide 171 being free to move outwardly relative to the slide 56, under the influence of the cam track 151 while passing the slide transfer zone S. Coil springs 194 (Fig. 25) are held under compression between the plate 175 and the auxiliary slide 171 for yieldingly holding the latter in the Fig. 21 position.

In Fig. 27 the broken line circles indicate the path which the cam roll 170 would need to follow during its passage through the slide transfer zones in order for the main cam track 52 to carry the load, assuming the slide 178 to be in its operative position (Fig. 25). It will be noted that this indicated path extends slightly inward beyond the auxiliary cam track 151. In other words, the track 151, which determines the path of the cam roll, holds it outwardly a short distance beyond that indicated, and so takes the load off the main cam roll.

It will be noted that as shown in Fig. 27, the main and auxiliary cam tracks 52 and 151 are substantially parallel throughout the portions which control the lowering and lifting of the mold carrier so that the finishing mold is always lowered to clear the gathering pot even when the apparatus is set for mold changing operations. Moreover, the transfer slide 154 is always shifted for normal operation by the cam 168 (Fig. 21) when the cam slide is moved inwardly for lowering the mold carrier, unless already in such position. If, however, the apparatus is set for mold changing, that is, as long as air pressure is maintained in the motor 159, the transfer slide 154 is returned by the cam 166 as the mold carrier swings upward at the slide transfer zone S', to release the control from the main track 52 to the auxiliary track 151 for holding the carrier in its mold changing position 58a as above described.

The operation may be summarized as follows. When it is desired to change the molds on any unit of the machine, the air valve lever 107 (Fig. 14) for said unit is thrown to open the valve 111. If desired, the vacuum line of said unit may also be closed as is usual for mold changing operations. Opening of the valve 111 actuates the three air motors 83, 135 and 159, which respectively control the opening and closing of the neck mold, the opening and closing of the finishing mold, and the up and down swinging movements of the finishing mold carrier. The motor 83 then operates as heretofore described to effect an operation of the air motors 73 and 70 (Fig. 2), the latter operating through the lever 65 and sleeve 64 to open the neck mold and hold it open for the mold changing operation. The motor 135 operates the latch mechanism (Figs. 16 and 17) and thus releases the cam operated slide 51 from the control of the cam 47 which normally opens and closes the finishing mold. Such operation of the latch mechanism also causes the latch 140 to hold the finishing mold in open position. The motor 159 at the same time operates the cams 166 and 183 (Fig. 21) so that the transfer slide 154 is shifted by the cam 166 to transfer the control of the mold carrier to the auxiliary cam 151 as the mold moves upward after discharging the blown article. The cross bar 175 is now in the position shown in Fig. 25, with the lugs 176 and 177 in register, and the auxiliary cam operates through the roll 170, auxiliary slide 171 and slide 56 to hold the carrier in a mold changing position until the finishing mold again nears the gathering pot. The cam 183 operates the means by which the pressure on the transfer slide 154, due to the weight of the mold carrier, is taken off the slide, permitting its free operation.

The three control mechanisms cooperate to hold the neck mold, blank mold and finishing mold open concomitantly and in convenient position to permit the molds to be lifted off their carrying arms and replaced by other molds, such position being retained while the carriage travels through approximately one-half of a complete rotation. The molds are thus held during each rotation until the manual control valve 111 is again closed and the normal operating conditions are automatically reestablished.

Modifications may be resorted to within the spirit and scope of my invention.

I claim:

1. A machine for forming glass articles comprising a mold carriage, means for rotating the carriage, a partible neck mold, a partible finishing mold cooperating therewith, said molds being mounted on the carriage for rotation therewith, means for periodically opening and closing the neck mold, means for periodically opening and closing the finishing mold, a manual control device, and means actuated thereby for taking the said molds out of the control of said mold opening and closing means, and separately controlling the opening and closing movements of the molds during the rotation of the mold carriage.

2. A machine for forming glass articles comprising a mold carriage, means for rotating it continuously, a mold group mounted on the carriage including a partible neck mold and a partible finishing mold, mechanism for opening and closing the finishing mold, mechanism for swinging the finishing mold into and out of register with the neck mold, a manual control device operable to take the molds out of the control of said mechanisms, and means controlled by said manual control device to hold the molds in predetermined positions to facilitate mold changing operations, said control device being operable to again bring the molds under the control of said mechanisms while the carriage is rotating.

3. A machine for forming glass articles comprising a mold carriage, means for continuously rotating the carriage about a vertical axis, a partible neck mold, a partible finishing mold, said molds being mounted to rotate with the carriage, a stationary cam, mechanism for opening and closing the neck mold controlled by said cam, mechanism for opening and closing the finishing mold, a second stationary cam controlling said last mentioned mechanism, means for swinging the finishing mold toward and from the neck mold, a stationary cam controlling said mold swinging means, and manual control means operable while the mold carriage is rotating to take the molds out of the control of said cams and to again bring the molds under the control of said cams.

4. A machine for forming glass articles comprising a mold carriage, means for continuously rotating the carriage about a vertical axis, a partible neck mold, a partible finishing mold, said molds being mounted to rotate with the carriage, a stationary cam, mechanism for opening and closing the neck mold controlled by said cam, mechanism for opening and closing the finishing mold, a second stationary cam controlling said last mentioned mechanism, means for swinging the finishing mold toward and from the neck mold, a stationary cam controlling said mold swinging means, manual control means operable while the mold carriage is rotating to take the molds out of the control of said cams and to again bring the molds under the control of said cams, and mechanism cooperating with said manual control means for automatically controlling the movements of the molds while out of the control of said cams.

5. A machine for forming glass articles comprising a mold carriage, means for rotating the carriage continuously about a vertical axis, a neck mold mounted for rotation with the carriage, a finishing mold, a finishing mold carrier mounted on the carriage to swing up and down for moving the finishing mold into and out of register with the neck mold, a mechanism for opening and closing the neck mold, a stationary cam track controlling the operation of said mechanism, a mechanism for opening and closing the finishing mold, a cam track controlling the operation of said last mentioned mechanism, a mechanism for swinging the mold carrier, a cam track controlling said swinging mechanism, devices individual to said mechanisms and operable to take said mechanisms out of the control of their respective cams, and manual control means for controlling said devices and effecting their operation.

6. A machine for forming glass articles comprising a mold carriage, means for rotating the carriage continuously about a vertical axis, a neck mold mounted for rotation with the carriage, a finishing mold, a finishing mold carrier mounted on the carriage to swing up and down for moving the finishing mold into and out of register with the neck mold, a mechanism for opening and closing the neck mold, a stationary cam track controlling the operation of said mechanism, a mechanism for opening and closing the finishing mold, a cam track controlling the operation of said last mentioned mechanism, a mechanism for swinging the mold carrier, a cam track controlling said swinging mechanism, fluid operated motors individual to said mechanisms, means controlled by said motors for taking said mechanisms out of the control of their respective cam tracks, and a manual control device for effecting the operation of said motors.

7. A machine for forming glass articles comprising a mold carriage, means for rotating the carriage continuously about a vertical axis, a neck mold mounted for rotation with the carriage, a finishing mold, a finishing mold carrier mounted on the carriage to swing up and down for moving the finishing mold into and out of register with the neck mold, a mechanism for opening and closing the neck mold, a stationary cam track controlling the operation of said mechanism, a mechanism for opening and closing the finishing mold, a cam track controlling the operation of said last mentioned mechanism, a mechanism for swinging the mold carrier, a cam track controlling said swinging mechanism, means for facilitating mold changing operations while the mold carriage is rotating including means for taking the molds out of the control of said cam tracks, holding the neck mold in an open position, holding the finishing mold open, and holding the finishing mold carrier at a convenient inclination for removal of the finishing molds, and a manual control device for effecting the operation of said last mentioned means.

8. A machine for forming glass articles comprising a mold carriage, means for rotating the carriage about a vertical axis, a finishing mold, a finishing mold carrier connected to the carriage for rotation therewith and mounted for up and down movements during its rotation with the carriage through a predetermined arc, a stationary cam track, means providing operating connections between said cam track and the carrier for controlling said up and down movements while the carrier is traveling through said arc, a second cam track positioned and shaped to control the up and down movements of the mold carrier while the latter is traveling through said arc, and means for taking the mold carrier out of the control of the first said track and placing and maintaining it under the control of the second cam track during its travel through said arc.

9. A machine for forming glass articles comprising a mold carriage, means for rotating the carriage about a vertical axis, a finishing mold, a finishing mold carrier connected to the carriage for rotation therewith and mounted for up and down movements during its rotation with the carriage through a predetermined arc, a stationary cam track, means providing operating connections between said cam track and the carrier for controlling said up and down movements while the carrier is traveling through said arc, a second cam track positioned and shaped to control the up and down movements of the mold carrier while the latter is traveling through said arc, and means for taking the mold carrier out of the control of the first said track and placing and maintaining it under the control of the second cam track during its travel through said arc, said second cam track being positioned and shaped to hold the mold carrier in an intermediate inclined position suitable to permit mold changing operations during a predetermined portion of the mold travel with the carriage.

10. The combination of a machine for forming glass articles and a stationary gathering pot, said machine comprising a mold carriage rotatable continuously about a vertical axis, a finishing mold carrier pivotally mounted on the carriage for up and down swinging movement, a partible finishing mold mounted on the carrier, a stationary cam track, a cam roll running thereon, operating connections between said roll and the mold carrier, said cam track being shaped and positioned to guide the mold carrier downward to a lowered position for passing the gathering pot, and thereafter swinging the carrier upward, an auxiliary cam track, automatic means for shifting the control from the main cam track to the auxiliary cam track and maintaining the carrier under the control of the auxiliary cam track during that portion of each rotation of the mold carriage that the carrier is passing the gathering pot and said downward and upward swinging movements of the carrier are taking place, and returning the control to the main cam track during the remaining portion of each rotation of the mold carriage, and a manual control device for said shifting means.

11. A glass blowing machine of the Owens suction gathering type, comprising a mold carriage, means for rotating it continuously about a vertical axis, a mold carrier mounted on the carriage for up and down swinging movement, a mold removably supported on said carrier, a main stationary cam track, a cam follower roll running thereon, means providing operating connections between the roll and the mold carrier, said cam track being shaped and positioned to hold the mold carrier in its lifted position during a predetermined portion of each rotation of the mold carriage and for lowering and lifting the carrier during other predetermined portions of each said rotation, an auxiliary cam track and an auxiliary cam follower roll running on said auxiliary track, means providing operating connections between the auxiliary roll and the carrier, said auxiliary cam track being shaped and positioned to cause lowering and lifting of the carrier in substantially the same path as when under the control of said main cam track and during substantially the same portions of its rotation, a manual control device, and means controlled by said control device and brought into operation when said control device is actuated, to transfer the control of said swinging movements of the mold carrier from the main cam track to said auxiliary cam track at a predetermined point during the rotation of the carriage and again transfer the control to the main track at a different predetermined point during the rotation of the carriage.

12. A glass blowing machine of the Owens suction gathering type, comprising a mold carriage, means for rotating it continuously about a vertical axis, a mold carrier mounted on the carriage for up and down swinging movement, a mold removably supported on said carrier, a main stationary cam track, a cam follower roll running thereon, means providing operating connections between the roll and the mold carrier, said cam track being shaped and positioned to hold the mold carrier in its lifted position during a predetermined portion of each rotation of the mold carriage and for lowering and lifting the carrier during other predetermined portions of each said rotation, an auxiliary cam track and an auxiliary cam follower roll running on said auxiliary track, means providing operating connections between the auxiliary roll and the carrier, said auxiliary cam track being shaped and positioned to cause lowering and lifting of the carrier in substantially the same path as when under the control of said main cam track and during substantially the same portions of its rotation, a manual control device, and means controlled by said control device and brought into operation when said control device is actuated to transfer the control of said swinging movements of the mold carrier from the main cam track to said auxiliary cam track at a predetermined point during the rotation of the carriage and again transfer the control to the main track at a different predetermined point during the rotation of the carriage, said auxiliary track being shaped to hold the mold carrier at a convenient angle intermediate its upper and lower positions to facilitate mold changing operations.

13. A glass blowing machine of the Owens suction gathering type comprising a mold carriage, means for rotating it continuously about a vertical axis, a mold carrier pivotally mounted on the carriage for up and down swinging movement, a finishing mold on said carrier, a stationary cam track, a cam follower roll running on said track, means providing operating connections between the roll and the said carrier, said track being shaped to lower the carrier at a predetermined point during its rotation with the carriage for passing the gathering pot, then swinging the carrier upwardly to an inclined position permitting discharge of a blown article from the mold and thereafter lifting the carrier to and holding it in its upper position while the carriage rotates through a predetermined angle, an auxiliary stationary cam track, transfer means for transferring the control of the carrier from the main cam track to the auxiliary cam track, and a manual control device operable to effect the operation of said transfer means, said auxiliary cam track being shaped and positioned to hold the mold carrier at an intermediate inclined position during a predetermined portion of each complete rotation of the mold carriage coinciding in part with its rotation through said predetermined angle.

14. A glass blowing machine of the Owens suction gathering type comprising a mold carriage, means for rotating it continuously about a vertical axis, a mold carrier pivotally mounted on the carriage for up and down swinging movement, a finishing mold on said carrier, a stationary cam track, a cam follower roll running on said track, means providing operating connections between the roll and the said carrier, said track being shaped to lower the carrier at a predetermined point during its rotation with the carriage for passing the gathering pot, then swinging the carrier upwardly to an inclined position permitting discharge of a blown article from the mold and threafter lifting the carrier to and holding it in its upper position while the carriage rotates through a predetermined angle, an auxiliary stationary cam track, transfer means for transferring the control of the carrier from the main cam track to the auxiliary cam track, a manual control device operable to effect the operation of said transfer means, said auxiliary cam track being shaped and positioned to hold the mold carrier at an intermediate inclined position during a predetermined portion of each complete rotation of the mold carriage coinciding in part with its rotation through said predetermined angle, and automatic means for shifting the control of the carrier to the main cam track at a predetermined point and then back to the auxiliary cam track at another predetermined point during each said rotation of the mold carriage.

15. A glass blowing machine of the Owens suction gathering type comprising a mold carriage, means for rotating it continuously about a vertical axis, a mold carrier pivotally mounted on the carriage for up and down swinging movement, a finishing mold on said carrier, a main stationary cam track, a cam follower roll running on said track, a slide carrying said roll and mounted for reciprocating movement radially of the carriage, operating connections between the slide and the mold carrier including a second slide, a connector for transmitting movement from one said slide to the other, and manual control means operable to render said connector ineffective and thereby release the mold carrier from the control of said cam track.

16. A glass blowing machine of the Owens suction gathering type comprising a mold carriage, means for rotating it continuously about a vertical axis, a mold carrier pivotally mounted on the carriage for up and down swinging movement, a finishing mold on said carrier, a main stationary cam track, a cam follower roll running on said track, a slide carrying said roll and mounted for reciprocating movement radially of the carriage, operating connections between the slide and the mold carrier including a second slide, a connector for transmitting movement from one said slide to the other, manual control means operable to render said connector ineffective and thereby release the mold carrier from the control of said cam track, an auxiliary cam, and an auxiliary cam follower roll adapted to run thereon, said auxiliary roll being mounted to reciprocate with said second slide.

17. A machine for blowing glass articles comprising a mold carriage, means for rotating it continuously about a vertical axis, a mold carrier mounted for up and down movement on the carriage, a stationary cam track, upper and lower slides mounted for reciprocating movement radially of the mold carriage, a cam follower roll carried on the upper slide and running on said cam track, operating connections between the lower slide and the mold carrier for moving the latter up and down when said lower slide is reciprocated, a transfer slide bar mounted on one of said slides and movable into and out of position to provide a driving connection between said slides, and manually controlled means for shifting said slide bar into and out of operative position.

18. A machine for blowing glass articles comprising a mold carriage, means for rotating it continuously about a vertical axis, a mold carrier mounted for up and down movement on the carriage, a stationary cam track, upper and lower slides mounted for reciprocating movement radially of the mold carriage, a cam follower roll carried on the upper slide and running on said cam track, operating connections between the lower slide and the mold carrier for moving the latter up and down when said lower slide is reciprocated, a transfer slide bar mounted on one of said slides and movable into and out of position to provide a driving connection between said slides, a manual control device, and means whereby when said control device is actuated, said transfer slide bar is automatically operated for effecting an operative connection between said slides when the mold carrier reaches a predetermined point during each complete rotation of the mold carriage and for disconnecting the slides when the mold carrier is at a different predetermined point during each said rotation of the carriage.

19. A machine for blowing glass articles comprising a mold carriage, means for rotating it continuously about a vertical axis, a mold carrier mounted for up and down movement on the carriage, a stationary cam track, upper and lower slides mounted for reciprocating movement radially of the mold carriage, a cam follower roll carried on the upper slide and running on said cam track, operating connections between the lower slide and the mold carrier for moving the latter up and down when said lower slide is reciprocated, a transfer slide bar mounted on one of said slides and movable into and out of position to provide a driving connection between said slides, a manual control device, means whereby when said control device is actuated, said transfer slide bar is automatically operated for effecting an operative connection between said slides when the mold carrier reaches a predetermined point during each complete rotation of the mold carriage and for disconnecting the slides when the mold carrier is at a different predetermined point during each said rotation of the carriage, an auxiliary stationary cam track, and an auxiliary cam follower roll running thereon and controlling the up and down movements of the mold carrier while the said upper and lower slides are disconnected.

20. A glass blowing machine comprising a mold carriage, means for continuously rotating it about a vertical axis, a mold carrier mounted to swing on said carriage, a stationary cam track, upper and lower slides mounted for rotation with the mold carriage and for reciprocation radially thereof, a cam follower roll on the upper said slide and running on said cam track, operating connections between the lower slide and the mold carrier, a connector mounted on one of said slides and movable into and out of position to provide a driving connection between the slides, automatic means for shifting said connector into operative position at a predetermined point during each rotation of the mold carriage and for returning it to an inoperative position at another point during each rotation of the mold carriage, and manually controlled means for preventing operation of said shifting means and thereby continuously maintaining a driving connection between the said slides.

21. A glass blowing machine comprising a mold carriage, means for continuously rotating it about a vertical axis, a mold carrier mounted to swing on said carriage, a stationary cam track, upper and lower slides mounted for rotation with the mold carriage and for reciprocation radially thereof, a cam follower roll on the upper said slide and running on said cam track, operating connections between the lower slide and the mold carrier, a connector mounted on one of said slides and movable into and out of position to provide a driving connection between the slides, a fluid operated motor, a cam operatively connected to said motor and movable thereby into the path of said connector and thereby operable to shift said connector to an inoperative position when the mold carrier reaches a predetermined point during its rotation with the mold carriage, and means for automatically returning said connector when the mold carrier reaches another predetermined position during each said rotation.

22. A glass blowing machine comprising a mold carriage, means for continuously rotating it about a vertical axis, a mold carrier mounted to swing on said carriage, a stationary cam track, upper and lower slides mounted for rotation with the mold carriage and for reciprocation radially thereof, a cam follower roll on the upper said slide and running on said cam track, operating connections between the lower slide and the mold carrier, a connector mounted on one of said slides and movable into and out of position to provide a driving connection between the slides, automatic means for shifting said connector into operative position at a predetermined point during each rotation of the mold carriage and for returning it to an inoperative position at another point during each rotation of the mold carriage, an auxiliary cam track, and an auxiliary cam follower roll running on said auxiliary track, said auxiliary roll being mounted for reciprocating movement with said lower slide whereby said auxiliary track controls the position of the mold carrier on the carriage while said slides are disconnected.

23. A glass blowing machine comprising a mold carriage, means for continuously rotating it about a vertical axis, a mold carrier mounted to swing on said carriage, a stationary cam track, upper and lower slides mounted for rotation with the mold carriage and for reciprocation radially thereof, a cam follower roll on the upper said slide and running on said cam track, operating connections between the lower slide and the mold carrier, a connector mounted on one of said slides and movable into and out of position to provide a driving connection between the slides, automatic means for shifting said connector into operative position at a predetermined point during each rotation of the mold carriage and for returning it to an inoperative position at another point during each rotation of the mold carriage, an auxiliary cam track, an auxiliary cam follower roll running thereon, and means whereby the auxiliary track is operative through said auxiliary roll to shift said lower slide relative to the upper slide and thereby free the said connector for shifting movement.

24. A glass blowing machine comprising a mold carriage, means for continuously rotating it about a vertical axis, a mold carrier mounted to swing on said carriage, a main stationary cam track, an upper slide, a cam follower roll carried by said slide and running on said cam track, a lower slide, operating connections between the lower slide and the mold carrier, said slides mounted on the carriage for reciprocating movement radially thereof, a transverse slide bar carried on one of said slides and forming a driving connection between said slides, an auxiliary cam track, an auxiliary cam follower roll running thereon, an auxiliary slide carrying said last mentioned roll, said auxiliary slide mounted to reciprocate with said lower slide and having a limited movement relative thereto, and means for shifting said transverse slide bar and thereby transferring the control of the mold carrier from the main track to said auxiliary track, said auxiliary cam being operable through said auxiliary slide to move said lower slide relative to the upper slide and thereby free the transverse slide bar for shifting movement.

25. A machine for molding glass articles comprising a mold carriage, means for rotating the carriage about an axis, a mold mounted to rotate with the carriage, stationary cams providing continuous cam tracks surrounding said axis, cam follower rolls individual to and running on said tracks, mechanism providing operating connections between the rolls and the mold for moving the latter relative to the carriage and thereby causing the mold to travel in paths determined by the contour of the cam tracks, and manual means operable to effect a shifting of the control of the mold from one said cam to the other.

26. A machine for molding glass articles comprising a mold carriage, means for rotating the carriage about an axis, a mold mounted to rotate with the carriage, stationary cams providing continuous cam tracks surrounding said axis, cam follower rolls individual to and running on said tracks, mechanism providing operating connections between the rolls and the mold for moving the latter relative to the carriage and thereby causing the mold to travel in paths determined by the contour of the cam tracks, automatic means for shifting the control of the mold from one cam track to the other when the carriage reaches a predetermined position during its rotation and for returning the control to the first cam track when the carriage reaches a different predetermined position of rotation, and a manual setting device for selectively rendering said automatic shifting means inoperative and causing the control to remain under a single cam.

27. A molding machine comprising a mold carriage, means for rotating the carriage about an axis, a mold carrier mounted for rotation with the carriage and movable relative to the carriage, a stationary cam, means providing operating connections between the cam and said mold carrier, said cam being positioned and shaped to control the movements of the carrier relative to the carriage while the carrier is moving through a predetermined arc of its rotation with the carriage, a second stationary cam, means providing operating connections between said second cam and the mold carrier, said second cam being positioned and shaped to control the movements of the carrier relative to the mold carriage while the carrier is moving through said arc, and selective means for bringing the carrier under the control of said cams alternatively.

28. A molding machine comprising a mold carriage, means for rotating the carriage about an axis, a mold carrier mounted for rotation with the carriage and movable relative to the carriage, a stationary cam, means providing operating connections between the cam and said mold carrier, said cam being positioned and shaped to control the movements of the carrier relative to the carriage while the carrier is moving through a predetermined arc of its rotation with the carriage, a second stationary cam, means providing operating connections between said second cam and the mold carrier, said second cam being positioned and shaped to control the movements of the carrier relative to the mold carriage while the carrier is moving through said arc, said second cam being shaped and positioned to cause the carrier while under its control to travel in a different path than that in which it travels while under the control of the first mentioned cam, and manual means for selectively placing the carrier alternatively under the control of said cams.

29. A molding machine comprising a carriage, means for rotating the carriage about a vertical axis, stationary cams, each comprising a cam track surrounding said axis, a mold carrier mounted to rotate with the carriage and movable up and down thereon, slide blocks mounted on the carriage and slidable radially thereof, cam follower rolls carried on said slide blocks and running on said tracks, means providing operating connections between said slide blocks and the mold carrier and placing the movements of the mold carrier relative to the carriage under the control of the cam tracks, automatic means for causing the control to be shifted periodically from one cam track to the other, and a manual device for rendering said automatic shifting means ineffective and thereby placing the movements of the mold carrier under the control of a single cam throughout the rotation of the mold carriage.

RUSSELL G. ALLEN.